April 11, 1961

J. M. WARDLE 2,978,873

FISHWAY STRUCTURE

Filed Oct. 20, 1958

2 Sheets-Sheet 1

INVENTOR
James M. Wardle
BY Alex E. MacRae
ATTORNEY

April 11, 1961  J. M. WARDLE  2,978,873
FISHWAY STRUCTURE
Filed Oct. 20, 1958  2 Sheets-Sheet 2

INVENTOR
James M. Wardle
BY Alex. E. MacRae
ATTORNEY

Patented Apr. 11, 1961

2,978,873

FISHWAY STRUCTURE

James M. Wardle, Ottawa, Ontario, Canada, assignor to Northwest Power Industries Limited, Ottawa, Ontario, Canada Filed Oct. 20, 1958, Ser. No. 768,139

5 Claims. (Cl. 61—21)

This invention relates to fishway structures.

The problem of providing means for permitting passage of fish such as salmon over obstructions such as artificial dams in coastal rivers is well recognized. The problem involves the provision for passage of various types or varieties of salmon upstream for spawning and for the return of the fingerlings downstream.

Fishway structures heretofore proposed usually suffer from the disadvantages of complicated and expensive construction, of awkward and costly maintenance, and of failure to provide passage of fish to an adequate and satisfactory degree.

It is an object of this invention to provide a fishway structure which is subject to compact and convenient construction, which may be readily installed in any desired location, and which is fully adequate in ensuring passage of fish.

The invention contemplates the provision of a fishway comprising a fish ladder having therein a multiplicity of pools, said pools being disposed in successive order in a plurality of convolutions defining a helix, said convolutions being arranged one directly above the other, each said convolution having therein a plurality of pools, and each said pool having orifices communicating with adjacent pools.

Figure 2:
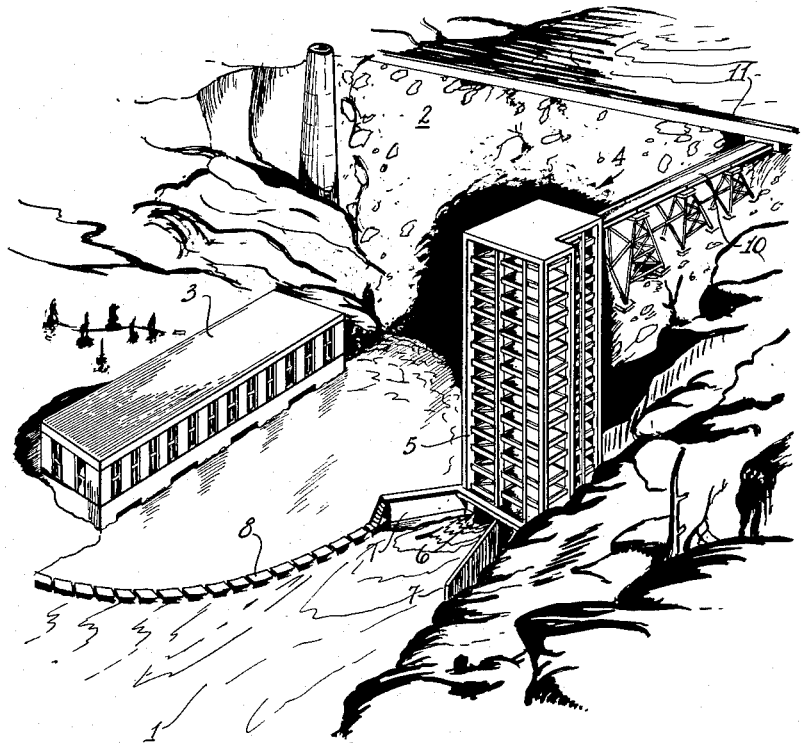
Figure 1:
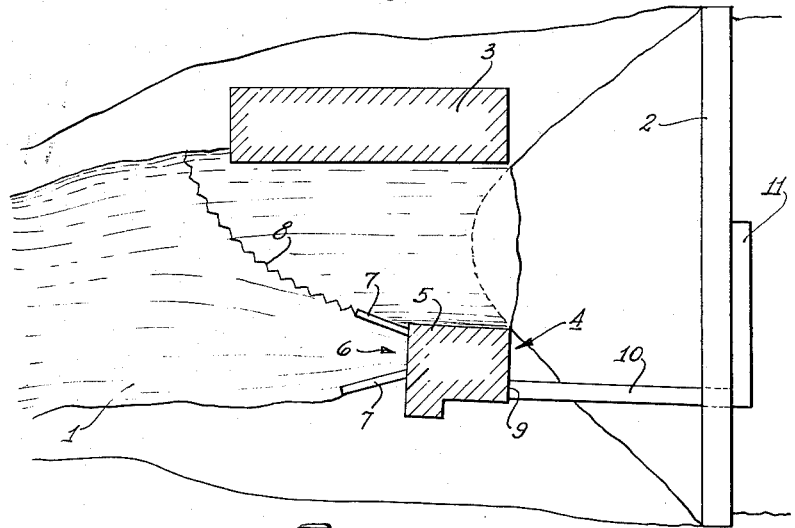
Figure 3:
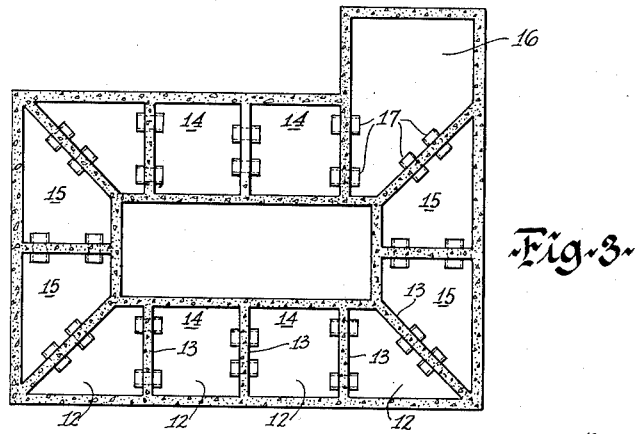
Figure 4:
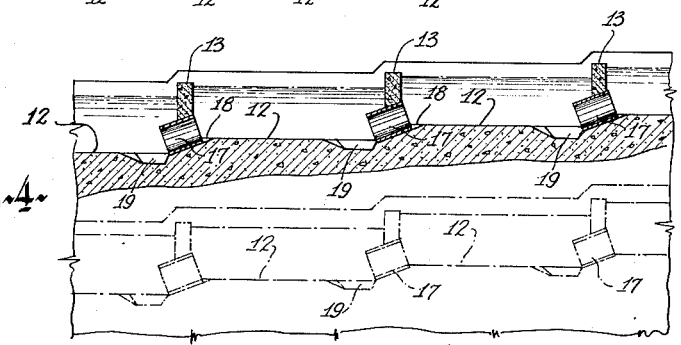
Figure 5:
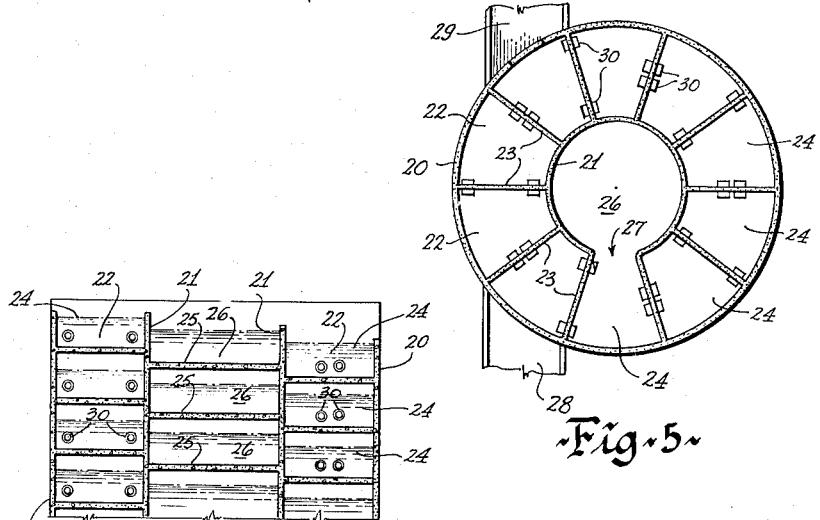
Figure 6:
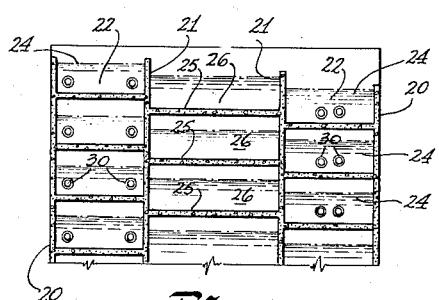

The invention will be described with reference to the accompanying drawings, in which Figure 1 is a plan view of a fishway installation in accordance with the invention, Figure 2 is a perspective view of the fishway installation shown in Figure 1, Figure 3 is a plan view of a fishway structure in accordance with the invention, Figure 4 is a partial side elevation of the fishway structure shown in Figure 3, Figure 5 is a plan view of a modified form of fishway structure, and Figure 6 is a partial side elevation of the fishway structure shown in Figure 5, Referring to Figures 1 and 2, 1 is a river having an artificial dam 2 forming part of a power supply system which includes a power house 3 on one shore of the river adjacent the downstream side of the dam.

The fishway structure in accordance with the invention which is arranged to provide a dam by pass for the fish is generally indicated at 4. It includes a fish ladder 5 which, in the installation illustrated, is located adjacent the shore of the river opposite to the power house 3. The ladder 5 has a fish entrance 6 at the bottom thereof and may be provided with a pair of wing walls 7 leading to such entrance. A fish barrier 8 leading from the end of the outer wing wall across the river may be provided to guide the fish into the ladder. The ladder has a fish outlet 9 adjacent the top communicating with an aqueduct 10, which extends across the dam below the crest thereof. The aqueduct 10 communicates with an inclined slope section 11 on the upstream side of the dam and extending upwardly towards the crest. The ladder 5 is adapted to provide a fish elevator of constant height and extending throughout the major portion of the difference in downstream and upstream water levels, whereas the inclined slope section 11 will accommodate fluctuations in water levels in the upstream head pond and provide an outlet for the fish at any such varying level. Normally, such fluctuations in water levels will not exceed 20 feet.

The fish ladder will now be described with particular reference to Figures 3 and 4. It comprises a multiplicity of steps 12 arranged in a helix of generally rectangular configuration in cross section. A wall or baffle 13 forms a continuation of the river of each step thereby to form an enclosure for a pool of water. A plurality (twelve as shown) of such pools are provided in each convolution of the helix as indicated in Figure 4. Pools 14 may be of uniform symmetrical dimensions while corner pools 15 are necessarily of irregular shape. One of such corner pools 15 has a laterally extending portion 16 which constitutes a resting pool. Each pool communicates with adjoining pools through orifices 17. As shown, two such orifices are provided in each baffle 13 and they may be arranged in staggered relation with those in one wall of a pool adjacent the midsection thereof and those in the other wall adjacent the sides thereof. Each orifice is preferably located adjacent the bottom or floor of the pools and is inclined to provide a convenient passage for fish from one pool to another. The angle of inclination may be of the order of 20°. At the entrance end of each orifice, the pool floor may be slightly inclined as indicated at 18 and at the outlet end the pool floor is preferably provided with a spoon-shaped depression 19.

The arrangement and dimensions of the pools, with resting pools at fixed intervals, are such as to simulate the varying rates of swimming speed of fish. While such characteristics will vary widely and will depend to some extent on the circumstances surrounding each particular installation, the following data is given as representative of a typical installation:

| | |
|---|---|
| Overall plan dimensions | a rectangle 80 x 120 feet, with a hollow central area 30 x 70 feet. |
| Number of pools in each convolution | 12, pool No. 1 being directly under pool No. 13 in the next convolution. |
| Number of constructions | 14. |
| Resting pools every | 12th pool. |
| Enlarged size of resting pool | 20 x 35 feet. |
| Width of pool | 25 feet. |
| Number of pools | 168. |
| Equivalent length if extended horizontally | 3,920 feet. |
| Head, or difference in water level between pools | 1.5 feet. |
| Vertical distance between top of floor of pool and floor of pool overhead | 18 feet. |
| Rate of climb | 1 vertical in 15.5 horizontal. |
| Depth of water in pool | 7 feet. |
| Orifices | 2 at 2'9" diameter. |
| Distance along center line for one convolution | 280 feet. |
| Length of pools on center line | 8 pools, 22½ feet, 4 pools, 25 feet per convolution. |
| Average assumed time for fish to pass | 10 hours. |
| Maximum number of fish in structure at any one time | 29,170. |
| Number of fish passing through structure daily | 38,000. |

The resting pools are arranged in vertical alignment for economy in foundations.

It will be understood that the fish ladder may be of square rather than rectangular configuration but, in a narrow river valley, a rectangular configuration is believed preferable.

The fish ladder and associated flumes may be constructed of wood, reinforced concrete or other suitable materials or combinations thereof.

It is proposed that the direction of the helix for climbing fish would be clockwise if the ladder is on the left hand side of the river and anti-clockwise if on the right hand side of the river.

The number of convolutions need not necessarily be a completed number but rather may finish with a half spiral so that entrance and exit pools are on opposite ends of the structure.

It is of course desirable to make conditions as easy as possible for ascending fish to enter the fish ladder. It has been heretofore proposed to release additional water in the lower portion of the fishway in order that there may be a stratum of downstream water at every depth in the river below the dam. In the structure described it would be easy to introduce additional attraction way in the lower section of the fish ladder during periods of high water in the tail race.

The structure described is quite compact whereby electric lighting and physical supervision are simplified. In the case of a concrete dam, the fishway might be built as a part of the dam structure with resulting economy in costs.

While a square or rectangular fish ladder structure permits ease of construction of resting pools, the structure may be of circular type as shown in Figures 5 and 6. This structure comprises two concentric cylindrical walls 20 and 21 and a multiplicity of spirally or helically arranged steps 22 therebetween and extending from bottom to top of the structure. Radially extending walls or baffles 23 form divisions between the steps to produce a plurality of pools 24 in helically ascending order. A plurality of spaced floors 25 in the central area within cylindrical wall 21 forms a plurality of resting pools 26, each of which communicates with one pool 24 in each convolution through opening 27. The lower entrance to the ladder is indicated at 28 and the upper entrance at 29. Two orifices 30 in each baffle 23 are provided for communication between the pools.

While dimensions and characteristics of particular installations of the circular type of fish ladder will vary widely, the following data relating to a particular installation is given by way of example:

Overall structure:
```
  Height _____ 252 feet.
  Diameter _____ 90.6 feet.
  Number of spirals_____ 19.3.
  Rise per spiral_____ 12.95 feet.
  Center line length of one
    spiral _____ 200 feet.
  Gradient _____ 1:15.45
  Number of pools per
    spiral _____ 10 (including one resting
                            pool).
  Rise per pool _____ 1.295 feet.
  Discharge _____ 108 c.f.s.
Regular pools:
  Length of center line__ 19 feet.
  Width _____ 25 feet.
  Area _____ 475 sq. feet.
  Depth of water _____ 7 feet.
  Velocity of water _____ 0.7 feet per sec.
Resting pools:
  Consist of regular pool plus
    circular inside pool.
  Diameter of circular pool__ 36.6 feet.
  Area of circular pool_____ 1,050 sq. feet.
  Total area of resting pool__ 1,525 sq. feet.
Orifices:
  Two in each baffle
  Diameter _____ 2'9".
  Length _____ 3 feet, inclined 20° to
                            horizontal.
  Water velocity _____ 9.1 feet per sec.
  Discharge _____ 108 cu. feet per sec.
```

It will be observed that, in the case of the two examples given, the rate of climb is of the order of 1:15.5.

It is believed that the gradient should not be substantially steeper than 1:14 and will generally be of the order of 1:15.

It is proposed to introduce a substance into the water adjacent the entrance of the fish ladder such substance being adapted to increase the urge of the salmon to go upstream to spawn.

I claim:

1. A fishway comprising a multiplicity of pool enclosures arranged in ascending order in a helix, said helix comprising a plurality of vertically aligned uniform convolutions, each said convolution having therein a plurality of said pool enclosures, each said pool enclosure having an imperforate bottom wall, end walls common to adjoining ones of said pool enclosures, and side walls joining said end walls, said side and end walls being contiguous with said bottom wall, and walls forming a resting pool extending laterally from and communicating with one of said pool enclosures in each said convolution, each said end wall having an orifice forming a fish passageway extending therethrough to permit passage of fish from one of said pool enclosures to another.

2. A fishway as defined in claim 1, said walls forming all of said resting pools being vertically aligned.

3. A fishway as defined in claim 1, the gradient of said helix being not substantially steeper than 1:14.

4. A fishway as defined in claim 1, each said orifice having an inlet adjoining the bottom wall of one of said pool enclosures and an outlet adjoining the bottom wall of the adjoining upper pool enclosure, said orifice being inclined upwardly from said inlet to said outlet, said bottom wall having a recess therein disposed below said inlet.

5. A fishway as defined in claim 1, said orifice in each said partition wall being in staggered position with respect to said orifices in adjacent partition walls.

References Cited in the file of this patent

UNITED STATES PATENTS

| | | |
|---|---|---|
| 1,718,181 | Province et al. | June 18, 1929 |
| 2,094,892 | Hurst | Oct. 5, 1937 |

FOREIGN PATENTS

| | | |
|---|---|---|
| 490,190 | France | Dec. 3, 1918 |